B. W. HARRIS.
METAL CULVERT.
APPLICATION FILED AUG. 3, 1908.
904,199.
Patented Nov. 17, 1908.
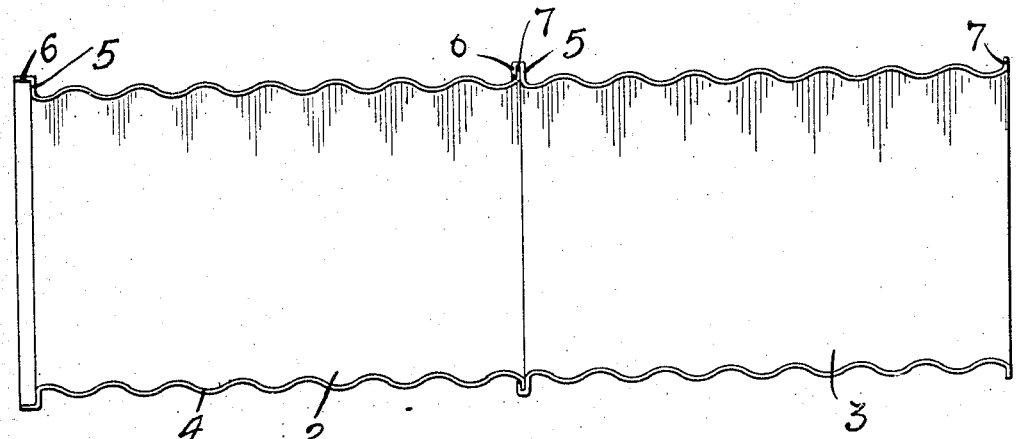
Fig 1.
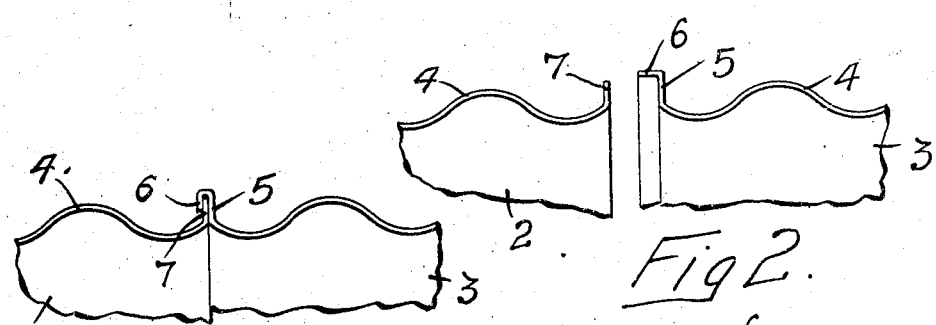
Fig 2.
Fig 4.
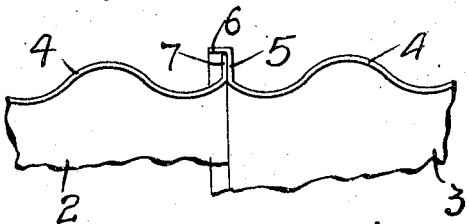
Fig 3.
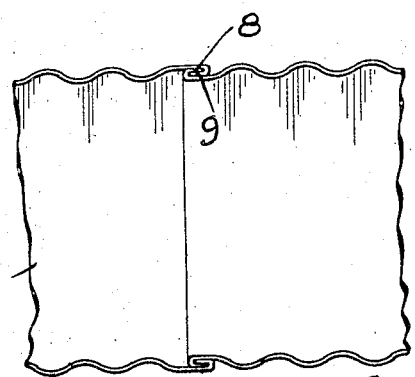
Fig 5.
WITNESSES
INVENTOR
BERNHARD W. HARRIS
BY Paul & Paul
HIS ATTORNEYS

UNITED STATES PATENT OFFICE.

BERNHARD W. HARRIS, OF MINNEAPOLIS, MINNESOTA.

METAL CULVERT.

No. 904,199.  Specification of Letters Patent.  Patented Nov. 17, 1908.

Application filed August 3, 1908. Serial No. 446,547.

*To all whom it may concern:*

Be it known that I, BERNHARD W. HARRIS, of Minneapolis, Hennepin county, Minnesota, have invented certain new and useful Improvements in Metal Culverts, of which the following is a specification.

My invention relates to metallic tubing or pipe adapted for use as a culvert and the object of the invention is to provide a simple inexpensive method for securing sections of pipe together to the end that the sections may be shipped separately or detached from one another to the point where the work is to be performed and then readily united and placed in the ditch.

My invention consists generally in various constructions and combinations, all as hereinafter described, and particularly pointed out in the claims.

In the accompanying drawings forming part of this specification, Figure 1, is a longitudinal sectional view illustrating two sections of culvert pipe and the means employed for securing their ends together. Figs. 2 and 3, and 4, illustrate the successive steps in the operation of joining the pipe sections together. Fig. 5, illustrates a modification in the manner of securing the sections to one another.

In the drawing, 2 and 3 represent sections of a culvert having annular corrugations 4 formed therein. These corrugations resist crushing strain and permit use of metal of a lighter gage in the construction of the culvert. One end of the culvert section is provided with a laterally extending flange 5 at right angles substantially to the longitudinal axis of the culvert, and terminating in a forwardly extending lip 6. This flange 5 forms a seat to receive a similar flange 7 formed on the end of the adjoining pipe section, said flange 7 being outwardly turned in the same manner as the flange 5, but somewhat shorter, so that it fits easily within the lip 6 until it contacts with the flange 5 and forms a close joint therewith. When this has been done, the lip 6 laps by the edge of the flange 7, as indicated in Fig. 3, and the edge of the lip is then hammered down around the flange 7, as shown in Fig. 4, until the flanges 5 and 7 are locked securely together. In short sections of pipe for small culverts, this may be done before shipping from the factory, but in long lengths, the pipe sections will be placed end to end at the work and the lips 6 hammered down around the flange 7, and then the pipe sections will be rolled into the ditch to form the completed culvert. With this construction, bolts and rivets are eliminated and the cost of the culvert considerably reduced.

In Fig. 5, I have shown a modification which consists in providing a flange 8 that is turned back upon itself or is bent outwardly into a plane parallel with the longitudinal axis of the pipe. The adjoining section has a similar flange 9 which is bent inwardly and is adapted to interlock with the flange 8 when the sections are placed together. In uniting the sections, the flange 8 is inserted within the end of the adjoining pipe section and then the flange 9 is formed by forcing the edge of the pipe inwardly until it interlocks with the outwardly turned flange 8. If preferred, these flanges may then be drilled and bolts or rivets inserted therein. This additional securing means, I don't however regard as essential, as the interlocking flanges will be sufficient to hold the pipe sections together.

I claim as my invention:

1. A culvert, comprising pipe sections having laterally extending flanges formed on the ends thereof, the flange at one end of one pipe section having a forwardly projecting lip parallel substantially with the longitudinal axis of the pipe section, said lip being adapted to inclose the flange of the adjoining pipe section when the sections are placed end to end and be bent down around the flange of said adjoining section, thereby locking the culvert sections together.

2. A metal culvert, comprising cylindrical pipe sections, having annular corrugations formed therein and laterally extending flanges on the ends of said sections, the flange at one end of a section being of greater width than the flange at the other end of the same section and having its edge bent outwardly in a direction parallel substantially with the longitudinal axis of the pipe section and said flange so formed being adapted to receive the narrower flange on the end of the abutting pipe section, the two sections fitting end to end without telescoping and the forwardly extending edge of said first named section being sufficiently flexible to permit it to be hammered inwardly around the edge of the flange on the abutting section, thereby locking said sections together.

In witness whereof, I have hereunto set my hand this 27th day of July 1908.

BERNHARD W. HARRIS.

Witnesses:
RICHARD PAUL,
J. A. BYINGTON.